(12) United States Patent
Hefetz

(10) Patent No.: US 10,554,645 B2
(45) Date of Patent: *Feb. 4, 2020

(54) METHOD FOR AUTHENTICATING INTERNET USERS

(71) Applicant: Guy Hefetz, Boca Raton, FL (US)

(72) Inventor: Guy Hefetz, Boca Raton, FL (US)

(73) Assignee: Spriv LLC, New York, NY (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/859,589

(22) Filed: Dec. 31, 2017

(65) Prior Publication Data

US 2018/0124032 A1    May 3, 2018

Related U.S. Application Data

(60) Continuation-in-part of application No. 15/606,270, filed on May 26, 2017, now Pat. No. 10,289,833,
(Continued)

(51) Int. Cl.
*G06K 5/00* (2006.01)
*G06K 7/04* (2006.01)
(Continued)

(52) U.S. Cl.
CPC .............. *H04L 63/08* (2013.01); *G06F 21/44* (2013.01); *G06F 21/73* (2013.01); *G06Q 20/3224* (2013.01); *G06Q 30/06* (2013.01); *G06Q 50/265* (2013.01); *H04L 63/0853* (2013.01); *H04L 63/107* (2013.01); *H04M 15/8033* (2013.01); *H04W 4/029* (2018.02); *H04W 4/24* (2013.01); *H04W 4/80* (2018.02);
*H04W 12/06* (2013.01); *G06F 2221/2111* (2013.01); *H04L 63/0876* (2013.01); *H04L 63/168* (2013.01);
(Continued)

(58) Field of Classification Search
CPC .. G07F 7/1016; G07F 7/1025; G07C 9/00126
USPC .............. 235/380, 382, 385, 462.45, 472.01, 235/472.02
See application file for complete search history.

(56) References Cited

U.S. PATENT DOCUMENTS 5,945,944 A * 8/1999 Krasner ................ G01S 5/0036
342/357.46
6,012,144 A * 1/2000 Pickett ................... G06Q 20/04
380/33
(Continued)

*Primary Examiner* — Daniel St Cyr
(74) *Attorney, Agent, or Firm* — Cittone Demers & Arneri LLP; James P. Demers

(57) ABSTRACT

A method and system for authenticating an Internet user identity by cross-referencing and comparing at least two independent sources of information. A first geographical location of a computer signature of an internet user is identified, and the geographical location of a communication voice device of said internet user is identified to determine a second location. The first and second locations are compared for geographical proximity to confirm the identity of the internet user. Based upon geographical proximity of said locations, a score may be assigned to the internet user, and access to a website or authorization to carry out a transaction may be allowed or limited based upon said score. Alternatively, additional authentication information can be required or access can be terminated.

18 Claims, 2 Drawing Sheets

Related U.S. Application Data which is a continuation-in-part of application No. 15/134,545, filed on Apr. 21, 2016, now Pat. No. 9,727,867, which is a continuation-in-part of application No. 14/835,707, filed on Aug. 25, 2015, now Pat. No. 9,391,985, which is a division of application No. 14/479,266, filed on Sep. 5, 2014, now abandoned, which is a continuation-in-part of application No. 14/145,862, filed on Dec. 31, 2013, now Pat. No. 9,033,225, which is a continuation-in-part of application No. 13/479,235, filed on May 23, 2012, now Pat. No. 8,770,477, which is a continuation-in-part of application No. 13/290,988, filed on Nov. 7, 2011, now Pat. No. 8,413,898, and a continuation-in-part of application No. 13/065,691, filed on Mar. 28, 2011, now Pat. No. 8,640,197, which is a continuation-in-part of application No. 12/600,808, filed as application No. PCT/US2007/012552 on May 29, 2007, now Pat. No. 8,370,909, and a continuation-in-part of application No. 12/357,380, filed on Jan. 21, 2009, now Pat. No. 8,656,458, said application No. 13/290,988 is a division of application No. 12/260,085, filed on Oct. 28, 2008, now abandoned, said application No. 13/065,691 is a continuation-in-part of application No. 12/260,065, filed on Oct. 28, 2008, now abandoned, said application No. 12/357,380 is a continuation-in-part of application No. 11/405,789, filed on Apr. 18, 2006, now Pat. No. 8,590,007, said application No. 12/260,065 is a continuation-in-part of application No. 11/346,240, filed on Feb. 3, 2006, now Pat. No. 7,503,489.

(60) Provisional application No. 61/445,860, filed on Feb. 23, 2011, provisional application No. 61/318,329, filed on Mar. 28, 2010, provisional application No. 60/711,346, filed on Aug. 25, 2005, provisional application No. 60/674,709, filed on Apr. 26, 2005.

(51) Int. Cl.
| | | |
|---|---|---|
| *H04L 29/06* | (2006.01) | |
| *G06Q 50/26* | (2012.01) | |
| *H04W 12/06* | (2009.01) | |
| *H04M 15/00* | (2006.01) | |
| *G06Q 30/06* | (2012.01) | |
| *G06Q 20/32* | (2012.01) | |
| *G06F 21/73* | (2013.01) | |
| *G06F 21/44* | (2013.01) | |
| *H04W 4/80* | (2018.01) | |
| *H04W 4/029* | (2018.01) | |
| *H04W 4/24* | (2018.01) | |
| *H04L 29/08* | (2006.01) | |
| *H04W 12/00* | (2009.01) | |

(52) U.S. Cl.
CPC ....... *H04L 67/02* (2013.01); *H04W 12/00503* (2019.01); *H04W 12/00512* (2019.01)

(56) References Cited

U.S. PATENT DOCUMENTS

| | | | | |
|---|---|---|---|---|
| 6,466,779 | B1* | 10/2002 | Moles | H04L 63/02 455/410 |
| 7,865,181 | B1* | 1/2011 | Macaluso | G06F 8/63 455/418 |
| 8,370,909 | B2* | 2/2013 | Heffez | H04L 63/107 705/14.23 |
| 8,413,898 | B2* | 4/2013 | Heffez | G06Q 20/32 235/380 |
| 9,033,225 | B2* | 5/2015 | Hefetz | G06Q 20/32 235/382 |
| 9,391,985 | B2* | 7/2016 | Hefetz | H04L 63/18 |

* cited by examiner

METHOD FOR AUTHENTICATING INTERNET USERS

CROSS-REFERENCE TO RELATED APPLICATIONS

This application is a continuation-in-part of U.S. patent application Ser. No. 15/606,270, filed May 26, 2017, now U.S. Pat. No. 10,289,833, which is a continuation-in-part of U.S. patent application Ser. No. 15/134,545, filed Apr. 21, 2016, now U.S. Pat. No. 9,727,867, which is a continuation-in-part of U.S. patent application Ser. No. 14/835,707, filed Aug. 25, 2015, now U.S. Pat. No. 9,391,985, which is a continuation-in-part of U.S. patent application Ser. No. 14/479,266, filed Sep. 5, 2014, which is a continuation-in-part of U.S. patent application Ser. No. 14/145,862, filed Dec. 31, 2013, which is a continuation-in-part of U.S. patent application Ser. No. 13/479,235, filed May 23, 2012, now U.S. Pat. No. 8,770,477, which is a continuation-in-part of U.S. patent application Ser. No. 13/065,691 filed Mar. 18, 2011, now U.S. Pat. No. 8,640,197, which in turn claims priority of U.S. provisional application No. 61/445,860 filed on Feb. 23, 2011 and U.S. provisional application No. 61/318,329 filed on Mar. 28, 2010.

U.S. patent application Ser. No. 13/065,691 is also a continuation-in-part of U.S. patent application Ser. No. 12/260,065 filed on Oct. 28, 2008 and published Apr. 23, 2009 as document 2009/0102712, which is a continuation-in-part of U.S. patent application Ser. No. 11/346,240 filed on Feb. 3, 2006, now U.S. Pat. No. 7,503,489, which in turn claims priority from U.S. provisional application No. 60/674,709, filed Apr. 26, 2005.

U.S. patent application Ser. No. 13/065,691 is also a continuation-in-part of U.S. patent application Ser. No. 12/357,380, filed on Jan. 21, 2009, now U.S. Pat. No. 8,656,458, which is a continuation-in-part of U.S. patent application Ser. No. 11/405,789 filed on Apr. 18, 2006, now U.S. Pat. No. 8,590,007, which in turn claims priority from U.S. provisional application No. 60/711,346 filed on Aug. 25, 2005.

U.S. application Ser. No. 13/065,691 is also a continuation-in-part of U.S. patent application Ser. No. 12/600,808, filed on May 29, 2007, now U.S. Pat. No. 8,370,909, which in turn is a 371 (National Stage in the US) of PCT/US07/012552 filed May 29, 2007.

U.S. application Ser. No. 13/479,235 is also a continuation-in-part of U.S. patent application Ser. No. 13/290,988, filed on Nov. 7, 2011, now U.S. Pat. No. 8,413,898, which in turn is a divisional of U.S. application Ser. No. 12/260,065, supra.

The contents of each one of the above prior applications is incorporated herein by reference in its entirety.

BACKGROUND OF THE INVENTION

The invention relates to a method and system for authenticating internet user identity, and more particularly, to a method and system for authenticating internet user identity by cross-referencing the geographical location of a internet user's Communication voice device, such as a mobile voice device, a Voice over Internet Protocol (hereinafter VoIP) telephone or non-mobile telephone, and the location of a client Internet Protocol (hereinafter IP address).

The use of the internet has become a common a popular arena for the sale of goods and services. Such sales require the transmission of personal and confidential data belonging to the buyer of such goods and services. Such information is often the target of identity theft. In response to the increase in the opportunity for the commission of fraud through identity theft, sellers and providers of goods and services through the internet require a method whereby such fraud can be reduced.

With respect to internet usage, upon accessing the internet, an internet user's computer is identified with an IP address, it should be understood that IP Address means any internet communication protocol such as but not limited to IPV4 and IPV6. And whenever the internet user enters a website, the internet user's IP address is identified to the website owner. Such identified IP addresses can be traceable geographically to its source so as to determine the location (state and city) of the internet user, in some cases the IP address can be traced to a radius of a few miles from its source. The comparison of the geographical location of the internet user IP address, with the geographical location of said internet user Communication voice device can provide the seller or provider a means to authenticate the identify of the internet user.

U.S. patent application Pub. No. 2001/0034718 A1 to Shaked et al. discloses a method of controlling access to a service over a network, including the steps of automatically identifying a service user and acquiring user information, thereby to control access. Additionally, a method of providing service over a network, in which the service requires identification of a user, including the steps of automatically identifying the user and associating the user with user information, thus enabling the service, is disclosed.

U.S. Pat. No. 6,466,779 to Moles et al. discloses a security apparatus for use in a wireless network including base stations communicating with mobile stations for preventing unprovisioned mobile stations from accessing an internet protocol (IP) data network via the wireless network.

U.S. patent application Pub. No. 2002/0188712 A1 to Caslin et al. discloses a fraud monitoring system for a communications system. The fraud monitoring system analyzes records of usage activity in the system and applies fraud pattern detection algorithms to detect patterns indicative of fraud. The fraud monitoring system accommodates both transaction records resulting from control of a packet-switched network and those from a circuit-switched network gateway.

U.S. patent application Pub. No. 2003/0056096 A1 to Albert et al. discloses a method to securely authenticate user credentials. The method includes encrypting a user credential with a public key at an access device. The public key is part of a public/private key pair suitable for use with encryption algorithm. The decrypted user credential is then transmitted from the decryption server to an authentication server for verification. The decryption server typically forms part of a multi-party service access environment including a plurality of access providers. This method can be used in legacy protocols, such as Point-to-Point Protocol (PPP), Password Authentication Protocol (PAP), Challenge-Handshake Authentication Protocol (CHAP), Remote Authentication Dial in User Server (RADIUS) protocol, Terminal Access Controller Access Control System (TACAS) protocol, Lightweight. Directory Access Protocol (LDAP), NT Domain authentication protocol, Unix password authentication protocol, Hypertext Transfer Protocol (HTTP), Hypertext Transfer Protocol over Secure sockets layer (HTTPS), Extended Authentication Protocol (EAP), Transport Layer Security (TLS) protocol, Token Ring protocol, and/or Secure Remote Password protocol (SRP).

U.S. patent application Publication Number US 2003/0101134 A1 published to Liu et al. on May 29, 2003 teaches a method for transaction approval, including submitting a transaction approval request from a transaction site to a clearing agency; submitting a user authorization request from the clearing agency to a user device; receiving a response to the user authorization request; and sending a response to the transaction approval request from the clearing agency to the transaction site. Another method for transaction approval includes: submitting a transaction approval request from a transaction site to a clearing agency; determining whether a trusted transaction is elected; submitting a user authorization request from the clearing agency to a user device if a trusted transaction is determined to be elected; receiving a response to the user authorization request from the user device if the user authentication request was submitted; and sending a response to the transaction approval request from the clearing agency to the transaction site. A system for transaction approval includes a clearing agency for the transaction approval wherein the clearing agency having a function to request for user authorization, a network operatively coupled to the clearing agency, and a user device adapted to be operatively coupled to the network for trusted transaction approval.

U.S. patent application Publication Number US 2003/0187800 A1 published to Moore et al. on Oct. 2, 2003 teaches systems, methods, and program products for determining billable usage of a communications system wherein services are provided via instant communications. In some embodiments, there is provided for authorizing the fulfillment of service requests based upon information pertaining to a billable account.

U.S. patent application Publication Number US 2004/0111640 A1 published to Baum on Jun. 10, 2004 teaches methods and apparatus for determining, in a reliable manner, a port, physical location, and/or device identifier, such as a MAC address, associated with a device using an IP address and for using such information, e.g., to support one or more security applications. Supported security applications include restricting access to services based on the location of a device seeking access to a service, determining the location of stolen devices, and authenticating the location of the source of a message or other IP signal, e.g., to determine if a prisoner is contacting a monitoring service from a predetermined location.

U.S. patent application Publication Number US 2005/0159173 A1 published to Dowling on Jul. 21, 2005 teaches methods, apparatus, and business techniques for use in mobile network communication systems. A mobile unit, such as a smart phone, is preferably equipped with a wireless local area network connection and a wireless wide area network connection. The local area network connection is used to establish a position-dependent, e-commerce network connection with a wireless peripheral supplied by a vendor. The mobile unit is then temporarily augmented with the added peripheral services supplied by the negotiated wireless peripheral. Systems and methods allow the mobile unit to communicate securely with a remote server, even when the negotiated wireless peripheral is not fully trusted. Also included are mobile units, wireless user peripherals, and negotiated wireless peripherals projecting a non-area constrained user interface image on a display surface.

U.S. patent application Publication Number US 2005/0160280 A1 published to Caslin et al. on Jul. 21, 2005 teaches providing fraud detection in support of data communication services. A usage pattern associated with a particular account for remote access to a data network is monitored. The usage pattern is compared with a reference pattern specified for the account. A fraud alert is selectively generated based on the comparison.

U.S. patent application Publication Number US 2005/0180395 A1 published to Moore et al. on Aug. 18, 2005 teaches an approach for supporting a plurality of communication modes through universal identification. A core identifier is generated for uniquely identifying a user among a plurality of users within the communication system. One or more specific identifiers are derived based upon the core identifier. The specific identifiers serve as addressing information to the respective communication modes. The specific identifiers and the core identifier are designated as a suite of identifiers allocated to the user.

While these systems may be suitable for the particular purpose employed, or for general use, they would not be as suitable for the purposes of the present invention as disclosed hereafter.

SUMMARY OF THE INVENTION

It is an object of the invention to produce a means to decrease the potential for fraud through authentication of the identity of an internet user. Accordingly, this method provides for authenticating the identity of the internet user or purchaser (hereinafter "internet user") through cross-referencing and comparison of at least two independent sources of information, such as, but not limited to, the IP address of the internet user's computer, geographical location of the internet user, router geographical location or the geographical location of number of a Communication voice device associated with said internet user.

It is another object of the invention to provide a means for providing an accurate geographical location of the internet user and the internet user's IP address. Accordingly, this method includes identifying the IP address and tracing it geographically using any one of the existing software programs that can trace IP addresses.

It is another object of the invention to provide a convenient means for determining the location of internet users at both mobile and non-mobile Communication voice devices and terminals. Accordingly, this method includes the utilization systems and software that are used to locate the geographical location of people or Communication voice devices, such as, but not limited to Global Positioning Systems (GPS), Galileo, WiMax, WiFi, RFID and external positioning apparatus, such as, but not limited to, cellular base stations and antennas.

It is another object of the invention to provide a convenient means for determining a more accurate geographical location of routers using the internet user Communication voice device's geographical location and the said user IP address.

This invention is a method and system for authenticating an internet user identity by cross-referencing and comparing at least two independent sources of information. A first IP address of an internet user is identified. The geographical location of the IP address is traced geographically to determine a first location. The geographical address of a communications device of said internet user is traced to determine a second location. The first and second locations are compared for geographical proximity to confirm the identity of the internet user. Additionally, depending on the geographical proximity of the first and second location, a positive or negative score may be assigned to the internet user, and access to the website and the ability to conduct transactions may be allowed or limited based on the assigned score. Alternatively, additional authentication information may be required of the internet user in order to proceed with the online transaction, or access by the internet user may be terminated.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE INVENTION

This invention relates to a method and system for authenticating internet user identity by cross-referencing or comparing at least two independent sources of information, identifying at least two geographical locations. Based upon geographical proximity of said locations, a score is assigned to the internet user, and predetermined access to a website and an ability to conduct transactions is allowed or limited based upon said score. Alternatively, additional authentication information can be required or access can be terminated. The invention is also a convenient means for determining a more accurate geographical location of routers.

Figure 1:
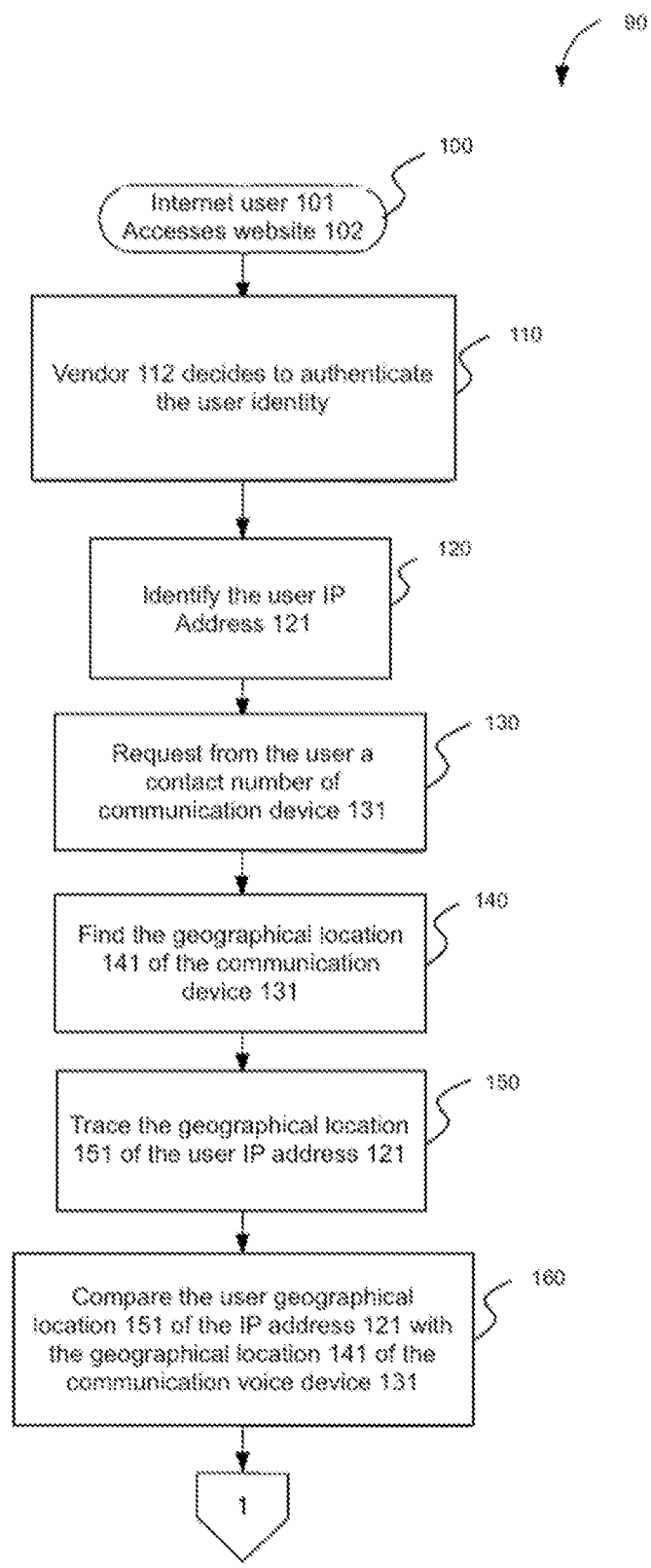
FIG. 1 is a flow chart of the method and system of the present invention.

FIG. 1 illustrates a method for authenticating internet user identity by cross-referencing and comparing at least two independent sources of information.

Figure 2:
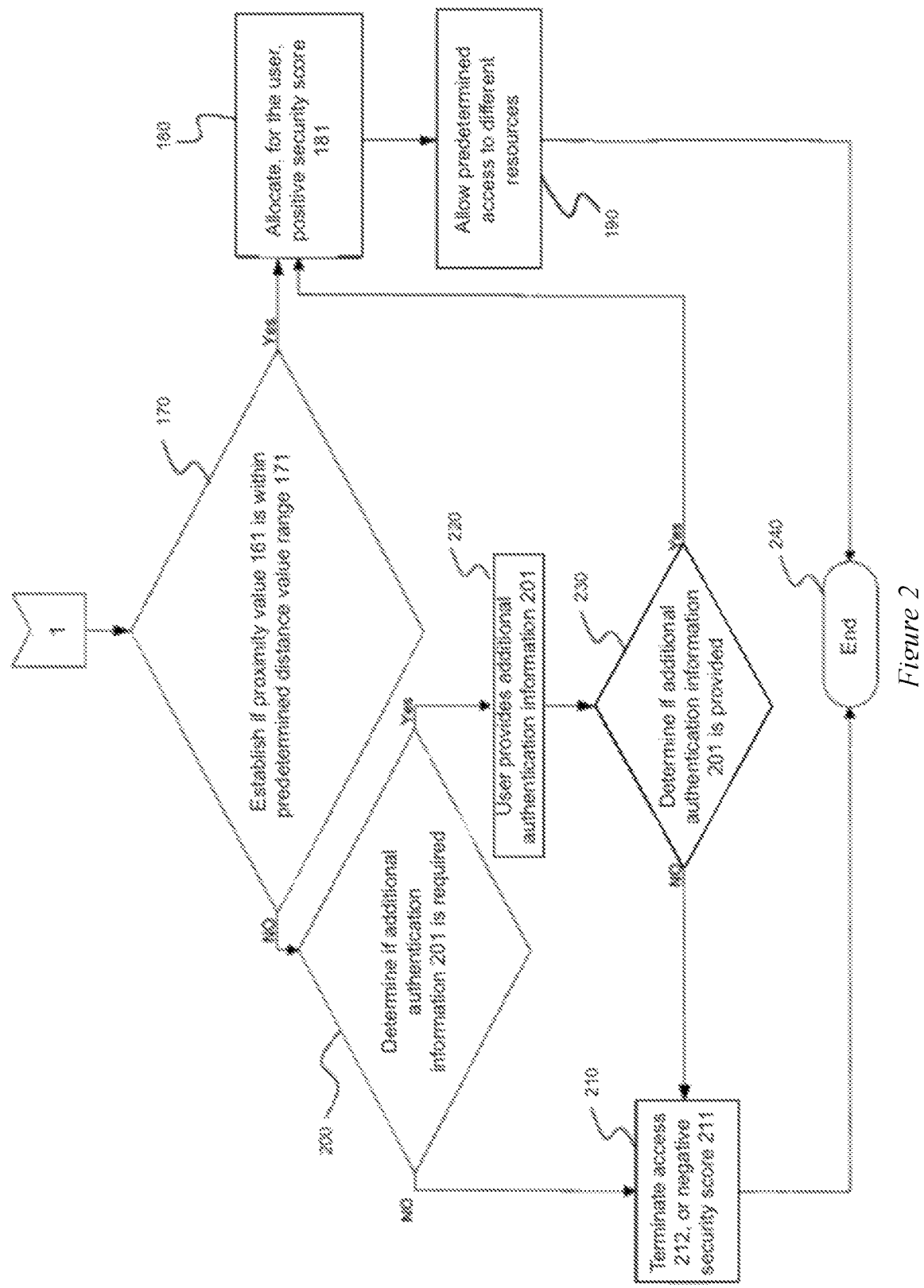
FIG. 2 is a continuation of the flow chart of the present invention.

FIG. 2 illustrates a method for allocating a score to an internet user based on the comparison of information in the steps of FIG. 1.

Referring to FIG. 1, the method 90 starts by when an internet user 101 accesses 100 a website 102 and provides information. The website 102 vendor 112 then decides to authenticate 110 internet user 101 identity, based on the information provided by the internet user 101. What information will trigger the decision to authenticate 110 the identity 113 of the internet user 101 will vary among vendors employing the method described herein. For purposes of clarity, the term vendor will be used hereafter and it should be understood that vendor means any business, organization or commercial entity which conducts on-line commercial transactions through a website on the internet, such as, but not limited to, banking institutions, on-line stores or other commercial entities.

Upon accessing a website 102, an IP address 121 of a computer of the internet user 101 will be identified 120. The invention is not limited to a conventional computer, but may include terminals, smart phones (PDA's) or other devices capable of communicating with the internet. Whenever the internet user 101 enters a website 102, the internet user's IP address 121 is identified for a website owner. It should be understood that IP Address means any internet communication protocol such as but not limited to IPV4 and IPV6.

The vendor 112 will then request 130 from the internet user 101 a contact number for a communications voice device 131, which is immediately accessible to the internet user 101 at the internet user's current location. Communication voice device, as used in the context of the present invention, applies to any voice device capable of communicating with another voice device such as, but not limited to, phone, mobile voice device, VoIP telephone or personal digital assistant (hereinafter PDA). Other non-limiting examples include any device that has been modified or designed for voice or text communication.

A geographical location 141 for the communication voice device 131 is then traced 140.

It should be understood that the term "mobile voice device", as used in the context of the present invention, applies to any mobile device modified or designed for voice or text communication and capable of communicating with another device via wireless network such as but not limited to cellular system, radio system, WiFi, WiMax, RFID, Bluetooth, MIMO, UWB (Ultra Wide Band), satellite system or any other such wireless networks known now or in the future.

Other non-limiting examples include any device that has been modified or designed to communicate with a web-ready PDA, a Blackberry, a laptop computer with cellular connect capability, or a notification server, such as email server.

The geographical location 141 of a telephone can be traced using any one of existing databases. As a non-mobile telephone is attached to a single physical location, the location is available using various existing databases. A Voice over Internet Protocol (hereinafter VoIP) telephone is connected to high speed internet access such as T1, DSL, cable modems, or other available connection systems. A VoIP location is available using various databases. A VoIP connection provider company can provide the IP address to which such VoIP telephone is connected such that the geographical location of the internet user is traceable to the IP address.

The geographical location 141 of a mobile voice device can be traced using technology such as, but not limited to, Galileo, GPS, cellular antenna network, phone antenna, WiFi, Bluetooth, MIMO, UWB, WiMax, etc.

A cellular telephone location system for automatically recording the location of one or more mobile cellular telephones is described, for example, in U.S. Pat. No. 5,327,144. The system comprises a central site system operatively coupled to at least three cell sites. Each of the cell sites receives cellular telephone signals and integrates a timing signal common to all the cell sites.

The central site calculates differences in times of arrival of the cellular telephone signals arriving among the cell sites and thereby calculates the position of the cellular telephone producing the cellular telephone signals. Additional examples of known methods for locating phones are cell sector and cell site.

The position of an internet user's mobile voice device can be determined by, for example: (1) an internal positioning apparatus such as a Global Positioning System (hereinafter GPS) receiver built into the mobile voice device that receives GPS radio signals transmitted from GPS satellites; and (2) an external positioning apparatus such as a cellular positioning system that computes the position of the mobile voice device by observing time differences among the arrivals of a radio signal transmitted by the mobile voice device at a plurality of observation points, i.e., base stations. The operation of the GPS is well-known and will not be described further herein.

Next, the geographical location 151 of the IP address 121 of the internet user 101 is traced 150. Such an IP address 121 can be traced 150 geographically to its source so as to determine the location 151 (state and city) of the internet user 101. In some cases the system used to trace the IP address 121 can be so accurate that it can identify a street and house number of the internet user 101.

Several non-limiting examples for geographically tracing 140 an IP address 121 are "tracert 212.96.20.101" when using Windows, "traceroute 212.96.20.101" when using Linux. "Neotrace" www.neotrace.com, or www.ip2location.com, which shows the internet user 101 IP address 121 and a location 151 (city and state) of the internet user 101.

Another means for obtaining the geographical location 151 of the internet user's 101 IP address 121, the internet user's 101 ISP can be contacted to request a full address from where the internet user 101 is connected. For example, a modem dial-up internet user 101 is assigned a unique IP address 121 by their ISP. After the internet user 101 enters a username and password the ISP knows from which phone number that internet user 101 called and can trace a contacting number to a geographical location 151.

The geographical location 141 of the communications voice device 131 is then compared 160 with the geographical location 151 of the IP address 121 of the internet user 101, and a proximity value 161 is determined.

Referring to FIG. 2, following the comparison 160 of the geographical location 151 of the IP address 121 and the geographical location 141 of communications voice device 131 of the internet user 101, and the obtaining of the proximity value 161, establish 170 if the proximity value 161 is within a predetermined distance value range 171. The predetermined distance value range 171 and a corresponding positive or negative score values are established by the website 102 vendor 112. If the value 161 is within the predetermined range 171, allocate 180 a positive security score 181 and allow predetermined access 190 to the website and allow the internet user 101 to conduct high risk actions such as, but not limited to, transferring money, sending check, purchasing a product or a service or transmitting personal information.

Following the comparison 150, if the value 161 is outside the predetermined distance value range 171, determine 200 if additional authentication information 201 is required. What additional authentication information 201 that will be required is to be determined by the website 102 vendor 112. If additional authentication information 201 is required, the internet user 101 provides 220 the required authentication information 201. After determining 230 that the required additional authentication information 201 has been correctly provided, allocate 180 a positive security score 181, and allow predetermined access 190 to the website. If it is determined 230 that the required additional authentication information 201 has not been provided, a negative security score 211 is allocated 210 or access is terminated 212.

The present invention includes a method of locating a router's geographical location based on internet user communication voice device's geographical location and internet user IP address. In addition, the invention includes a method of geographically comparing the user communication voice device and the closet public router to the user IP address. Furthermore, the invention includes a method of comparing the geographical location of a router with the geographical location of the communication voice device of an internet user. Lastly, the invention includes a method of geographically comparing the internet user communication voice device and the internet user IP address. All of the methods may utilize a communication voice device that is either non-mobile telephone, a mobile telephone or a mobile voice device.

For locating more accurate geographical location of the routers the Vendor can perform trace-route or similar network analysis commands to the known internet user IP address. The trace-route commands (such as "traceroute" in Unix, Linux and OS-x, and 'tracert' or 'pathping' in Windows operating systems) is used in a wide variety of computer operating systems and network appliances. A trace-route command causes packets to be sent out with short lifetimes in order to map the IP addressable route to another machine. Each packet is given a slightly different lifetime. When a router expires the packet, it sends back a notification that includes its IP address. This allows a machine to identify the addresses of all the routers between the vendor and the internet user computer on the Internet.

Since the following are known:
1. The geographical location of the user's communication voice device, and
2. The routing table between the vendor internet web site and the internet user, the vendor can locate the geographical location of the closest public router to the internet user IP address, since the first public router that the internet user is using is close geographically to the internet user voice communication device.

The invention also includes a method of geographically comparing an internet user physical address and an internet user IP address. As well as a method of comparing a geographical location of a router with a geographical location of an internet user physical address, and a method of locating a router's geographical location based on an internet user physical address geographical location and internet user IP address geographical location. The term physical address is construed to mean mailing address or mailing zip code.

It is to be understood that the present invention is not limited to the embodiments described above, but encompasses any and all embodiments under the doctrine of equivalents.

In conclusion, herein is presented a method and system for authenticating internet user identity. The invention is illustrated by example in the drawing figures, and throughout the written description. It should be understood that numerous variations are possible, while adhering to the inventive concept. Such variations are contemplated as being a part of the present invention.

I claim:

1. A computer-implemented method for authentication of an Internet user for access to a website, the user having access to a mobile phone and being in communication with the website via a device having an IP address, the method comprising the computer-implemented steps of:
   a. comparing a first geographical location, which is the geographical location of the mobile phone as determined by Wi-Fi, to a second geographical location, which is the geographical location of the IP address;
   b. if the distance between the first geographical location and the second geographical location is within a predetermined range, allowing the Internet user to access the website; otherwise
   c. if the distance between the first geographical location and the second geographical location is not within the predetermined range, requesting additional authentication information from the Internet user; and d. if the Internet user provides valid additional authentication information, allowing the Internet user to access the website; otherwise e. denying the Internet user access to the website.

2. The computer-implemented method of claim 1, wherein the device having an IP Address is a computer used by the Internet user to access the website.

3. The computer-implemented method of claim 2, further comprising the step of terminating communication with the computer if the additional authentication information is not provided.

4. The computer-implemented method of claim 1, wherein the IP Address is the IP Address of the mobile phone.

5. The computer-implemented method of claim 1, further comprising the step of terminating communication with the device having the IP address if the additional authentication information is not provided.

6. The computer-implemented method of claim 1, wherein the additional authentication information required from the Internet user is determined by a vendor conducting on-line transactions through the website.

7. The computer-implemented method of claim 1, further comprising comparing the second geographical location to a mailing address of the Internet user.

8. The computer-implemented method of claim 1, further comprising assigning the first geographical location to the IP address.

9. The computer-implemented method of claim 1, wherein the first geographical location and the second geographical location are locations of the same device.

10. The computer-implemented method of claim 1, wherein the computer first geographical location and the second geographical location are locations of separate devices.

11. The computer-implemented method of claim 1, further comprising terminating communication with said Internet user if the additional authentication information is not provided.

12. A computer-implemented method for authentication of an Internet user for access to a website, the user having access to a mobile phone and being in communication with the website via a device having an IP address, the method comprising the computer-implemented steps of:

a. comparing a first geographical location, which is the geographical location of the mobile phone, to a second geographical location, which is the geographical location of the IP address;

b. if the distance between the first geographical location and the second geographical location is within a predetermined range, allocating a positive security score to the Internet user; otherwise c. if the distance between the first geographical location and the second geographical location is not within the predetermined range, requesting additional authentication information from the Internet user; and d. if the Internet user provides valid additional authentication information, allocating a positive security score to the Internet user; otherwise e. if the Internet user does not provide valid additional authentication information, allocating a negative security score to the Internet user.

13. The computer-implemented method of claim 12, further comprising terminating communication with the Internet user if valid additional authentication information is not provided by the Internet user.

14. The computer-implemented method of claim 12, wherein the geographical location of the mobile phone is determined by using Wi-Fi.

15. The computer-implemented method of claim 12, further comprising comparing the second geographical location to a mailing address of the Internet user.

16. The computer-implemented method of claim 12, further comprising, assigning the first geographical location to the IP address used by the Internet user to access the website.

17. The computer-implemented method of claim 12, wherein the IP Address is the IP Address of a computer used by the Internet user to access the website, further comprising terminating communication with the computer if valid additional authentication information is not provided by the Internet user.

18. The computer-implemented method of claim 12, wherein the IP Address is the IP Address of the mobile phone.

* * * * *